US007331607B1

(12) United States Patent
Schneider

(10) Patent No.: US 7,331,607 B1
(45) Date of Patent: Feb. 19, 2008

(54) DUAL MODE OUTRIGGER FOR A BOOM TRUCK OR THE LIKE

(76) Inventor: William D. Schneider, 7011 W. McKelvie Rd., Malcolm, NE (US) 68402

( * ) Notice: Subject to any disclaimer, the term of this patent is extended or adjusted under 35 U.S.C. 154(b) by 0 days.

(21) Appl. No.: 11/521,332

(22) Filed: Sep. 14, 2006

Related U.S. Application Data

(62) Division of application No. 11/038,338, filed on Jan. 19, 2005, now Pat. No. 7,150,472.

(51) Int. Cl.
*B60S 9/02* (2006.01)

(52) U.S. Cl. ................................ 280/766.1; 280/763.1; 280/764.1; 280/765.1

(58) Field of Classification Search ............. 280/763.1, 280/764.1, 765.1, 766.1, 6.15, 6.153–6
See application file for complete search history.

(56) References Cited

U.S. PATENT DOCUMENTS

| | | | | |
|---|---|---|---|---|
| 3,310,181 | A * | 3/1967 | Symmank | 280/764.1 |
| 3,438,509 | A * | 4/1969 | Munz | 280/766.1 |
| 3,716,252 | A * | 2/1973 | Johnson | 280/766.1 |
| 3,871,685 | A * | 3/1975 | Senelet | 280/766.1 |
| 5,387,071 | A * | 2/1995 | Pinkston | 414/563 |

* cited by examiner

*Primary Examiner*—Christopher P. Ellis
*Assistant Examiner*—Vaughn T. Coolman
(74) *Attorney, Agent, or Firm*—Dennis L. Thomte; Thomte Law Office LLC

(57) ABSTRACT

A dual mode A-frame outrigger for a boom truck or the like is provided wherein the outrigger may be operated in conventional fashion or which may be pinned to the side of the boom truck or the like so that the outrigger assembly may be used to stabilize or level the boom truck without being swung outwardly from the side of the vehicle as in typical A-frame outrigger assemblies.

1 Claim, 7 Drawing Sheets

DUAL MODE OUTRIGGER FOR A BOOM TRUCK OR THE LIKE

CROSS-REFERENCE TO RELATED APPLICATION

This is a divisional application of Petitioner's earlier application Ser. No. 11/038,338 filed Jan. 19, 2005, now U.S. Pat. No. 7,150,472 entitled "DUAL MODE OUTRIGGER FOR A BOOM TRUCK OR THE LIKE".

BACKGROUND OF THE INVENTION

1. Field of the Invention

This invention relates to an outrigger for a boom truck or the like and more particularly to a dual mode outrigger for a boom truck or the like.

2. Description of the Related Art

Many types of outriggers or stabilizers have been previously provided for boom trucks, utility trucks, cranes, or the like. One type of prior art outrigger, commonly referred to as an "A-frame" outrigger is disclosed in U.S. Pat. No. 3,262,582. In the '582 structure, the upper end of a tubular leg section 232 is pivotally secured to a bracket unit 226 positioned at one side of the vehicle 24. A lower leg section 234 telescopes over section 232. Hydraulic cylinder 238 is positioned within leg sections 234 and 232 to cause leg section 234 to slidably move with respect to leg section 232. A pair of parallel links 256 are pivotally secured to leg section 234 and housing 216 by a pin means. In the stowed position, as seen in FIG. 5 of the '582 patent drawings, with cylinder 238 retracted, the leg sections 232 and 234 are positioned adjacent the side of the vehicle in a generally vertically disposed attitude. When hydraulic cylinder 238 is extended, the sections 232 and 234 swing outwardly about pivot pin 230, due to the action of the parallel links 256, so that the lower end of section 234 is positioned laterally outwardly of the vehicle, as seen in FIG. 3 of the '582 patent. In the '582 outrigger, extension of the hydraulic cylinder 238 always causes the outrigger to swing outwardly from the side of the vehicle. In other words, the leg sections cannot be maintained in the position of FIG. 5 of the '582 patent when the hydraulic cylinder 238 is extended.

In recent years, the A-frame outriggers have been lengthened and modified so that the lower ends of the outrigger may be positioned many feet laterally of the vehicle. In the typical A-frame outrigger of the prior art, the ground-engaging pad or shoe is spaced a considerable distance from the side of the vehicle. If the vehicle is positioned at one side of a roadway or the like, the outrigger at the street side of the vehicle extends many feet out onto the street or roadway, when deployed, thereby creating a traffic problem. If the street side outrigger cannot be deployed, it is impossible to level or stabilize the vehicle.

SUMMARY OF THE INVENTION

A dual mode outrigger for a boom truck or the like having upper and lower brackets secured to one side thereof. A first tubular member or leg section, having upper and lower ends, is pivotally secured at its upper end to the upper bracket. A second tubular member or leg section, having upper and lower ends, slidably embraces the first tubular member. A pair of elongated linkage members are pivotally connected to and extend between the lower bracket and the second tubular member. A third tubular member or leg section, having upper and lower ends, slidably embraces the second tubular member at the lower end thereof. The third tubular member is adapted to be selectively secured or pinned to the second tubular member for movement therewith. The second tubular member is adapted to be selectively secured to the lower bracket in a generally vertically disposed position adjacent one side of the boom truck. A hydraulic cylinder is positioned within the first, second and third tubular members. The hydraulic cylinder has its base end operably secured to the first tubular member and has its rod end secured to the lower end of the third tubular member. The hydraulic cylinder, upon being extended, causes the first, second and third tubular members to swing outwardly from the truck and causes the second tubular member and the third tubular member to slidably move together downwardly relative to the first tubular member, when the second tubular member is not secured to the lower bracket and the third tubular member is secured to the second tubular member. The hydraulic cylinder, upon being extended, causes the third tubular member to slidably move vertically downwardly on the second tubular member when the second tubular member is secured to the lower bracket and the third tubular member is not secured to the second tubular member.

The outrigger of this invention may be used conventionally when the third tubular member is secured to the second tubular member and the second tubular member is not secured to the lower bracket. If it is desired to maintain the outrigger in a position closely adjacent one side of the boom truck, the third tubular member is disconnected from the second tubular member and the second tubular member is secured to the lower bracket. Extension of the hydraulic cylinder then causes the third tubular member to slidably move vertically downwardly on the second tubular member so that the pad on the lower end thereof moves into ground engagement closely adjacent the side of the truck which enables the truck to be leveled without deploying the outrigger outwardly of the truck.

It is therefore a principal object of the invention to provide a dual mode outrigger for a boom truck or the like.

A further object of the invention is to provide a dual mode outrigger of the A-frame type wherein the outrigger may be used in its conventional manner but may also be operated in a position closely adjacent one side of the boom truck or the like.

Still another object of the invention is to provide a dual mode outrigger for a boom truck or the like which enables conventional A-frame outriggers to be modified so as to be a dual mode outrigger rather than a single mode outrigger.

These and other objects will be apparent to those skilled in the art.

DETAILED DESCRIPTION OF THE INVENTION

Figure 1:
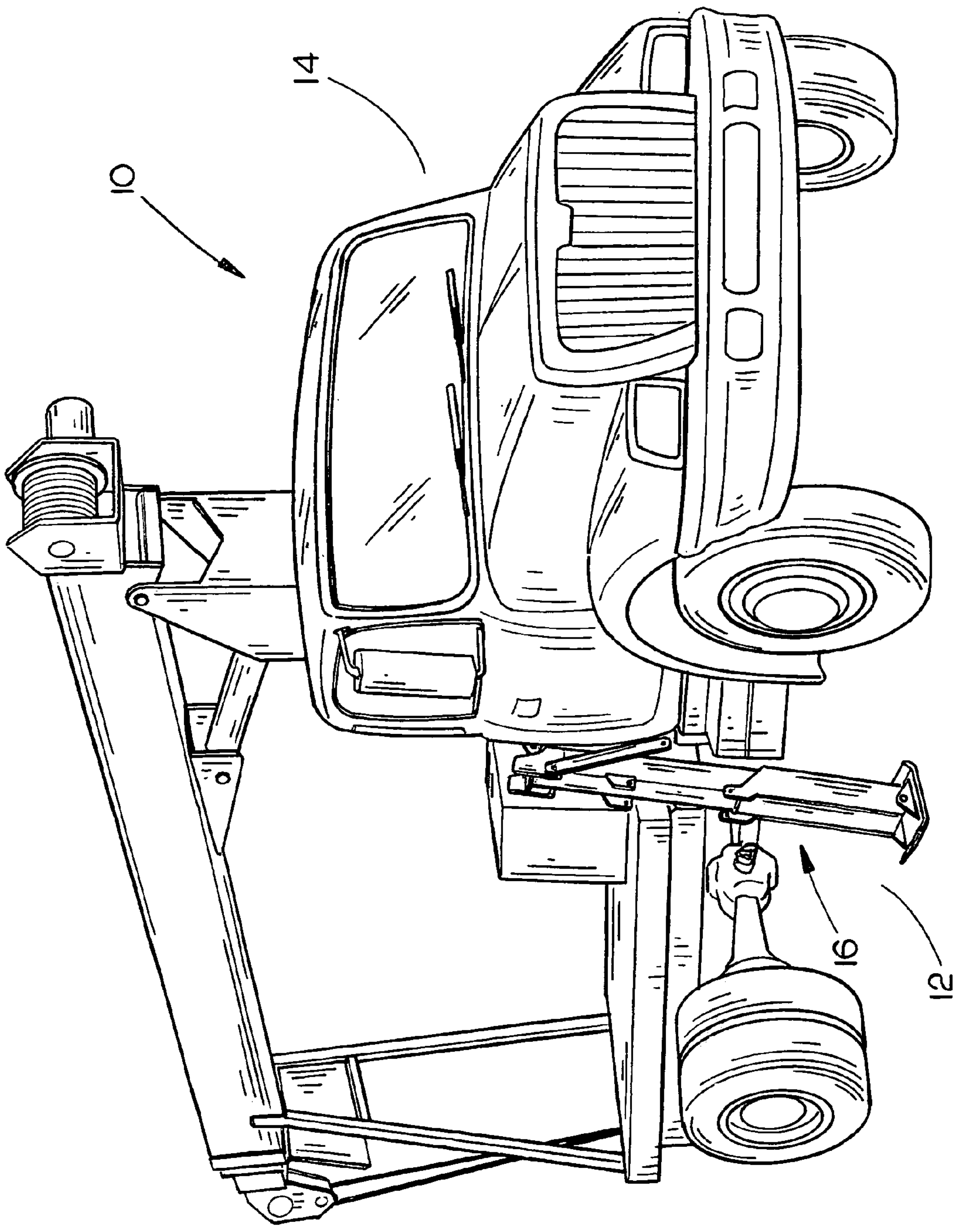
FIG. 1 is a front perspective view of the dual mode outrigger of this invention in its extended position while in its second mode position.
Figure 2:
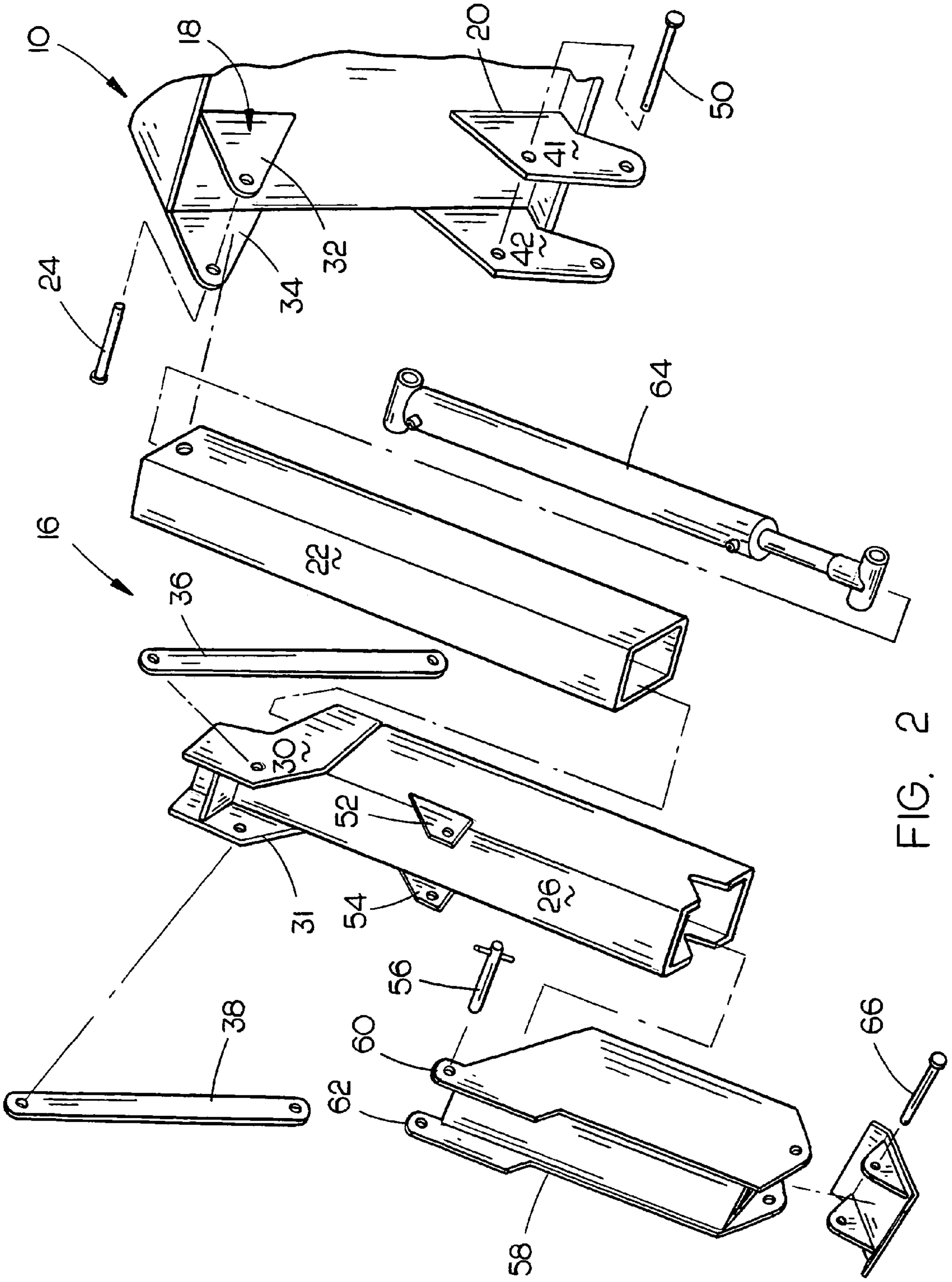
FIG. 2 is an exploded perspective view of the dual mode outrigger of this invention.

The numeral 10 refers generally to a boom truck, utility vehicle, crane, etc., which is adapted to have a telescopic boom or the like mounted thereon. For purposes of description, boom truck 10 will be described as having opposite sides 12 and 14. One or more outrigger assemblies 16 are mounted on the sides 12 and 14 of the truck 10. Normally, only a single outrigger assembly 16 will be mounted at each side of the boom truck 10. Inasmuch as each of the outrigger assemblies 16 is identical, only one of the assemblies 16 will be described in detail.

Upper and lower bracket assemblies 18 and 20 are provided at one side of the truck in a vertically spaced-apart relationship. Although brackets such as disclosed in the drawings are the preferred connections, other types of connections can obviously be provided on the truck. A first tubular member 22, having upper and lower ends, is pivotally secured at its upper end to upper bracket assembly 18 by pin 24. Preferably, the tubular member has four sides, but it could be a three-sided or generally U-shaped member if so desired. The numeral 26 refers to a second tubular member which slidably embraces first tubular member 22 and which also has upper and lower ends. The second tubular member 26 has a pair of plates 30 and 31 welded to the upper end thereof which are adapted to engage the bracket members 32 and 34 of upper bracket assembly 18, respectively, to limit the upward movement of second tubular member 26 with respect to first tubular member 22. Elongated links 36 and 38 are pivotally connected at their upper ends to the bracket members 32 and 34 by pins 39 and 40, respectively, and are pivotally connected at their lower ends to the bracket members 41 and 42 of lower bracket assembly 20 by pins 44 and 45, respectively.

Second tubular member 26 has a pair of inwardly extending ears or plates 48 and 48 which are adapted to register with holes formed in bracket members 41 and 42 so that second tubular member 26 may be selectively secured to bracket members 41 and 42 by a pin 50. Second tubular member 26 also has outwardly extending plates or ears 52 and 54 which are adapted to receive a pin 56 extending therethrough, as will be described in more detail hereinafter.

The numeral 58 refers to a third tubular member or boot which slidably embraces the lower end of second tubular member 26, as illustrated in the drawings. The upper end of third tubular member 58 has a pair of spaced-apart ears or plates 60 and 62 which are adapted to have the pin 56 extending therethrough so that the third tubular member 58 may be secured to second tubular member 26 for movement therewith.

An elongated hydraulic cylinder 64 is positioned within tubular members 22, 26 and 58, as also illustrated in the drawings. The base or upper end of hydraulic cylinder 64 is either pivotally connected to the upper end of first tubular member 22 or is pivotally connected to the pin 24. The lower end or rod end of hydraulic cylinder 64 is pivotally connected to the lower end of third tubular member 58 by pin 66. A pivotal shoe or pad 68 is pivotally secured to the lower end of third tubular member 58 by pin 66.

Figure 3:
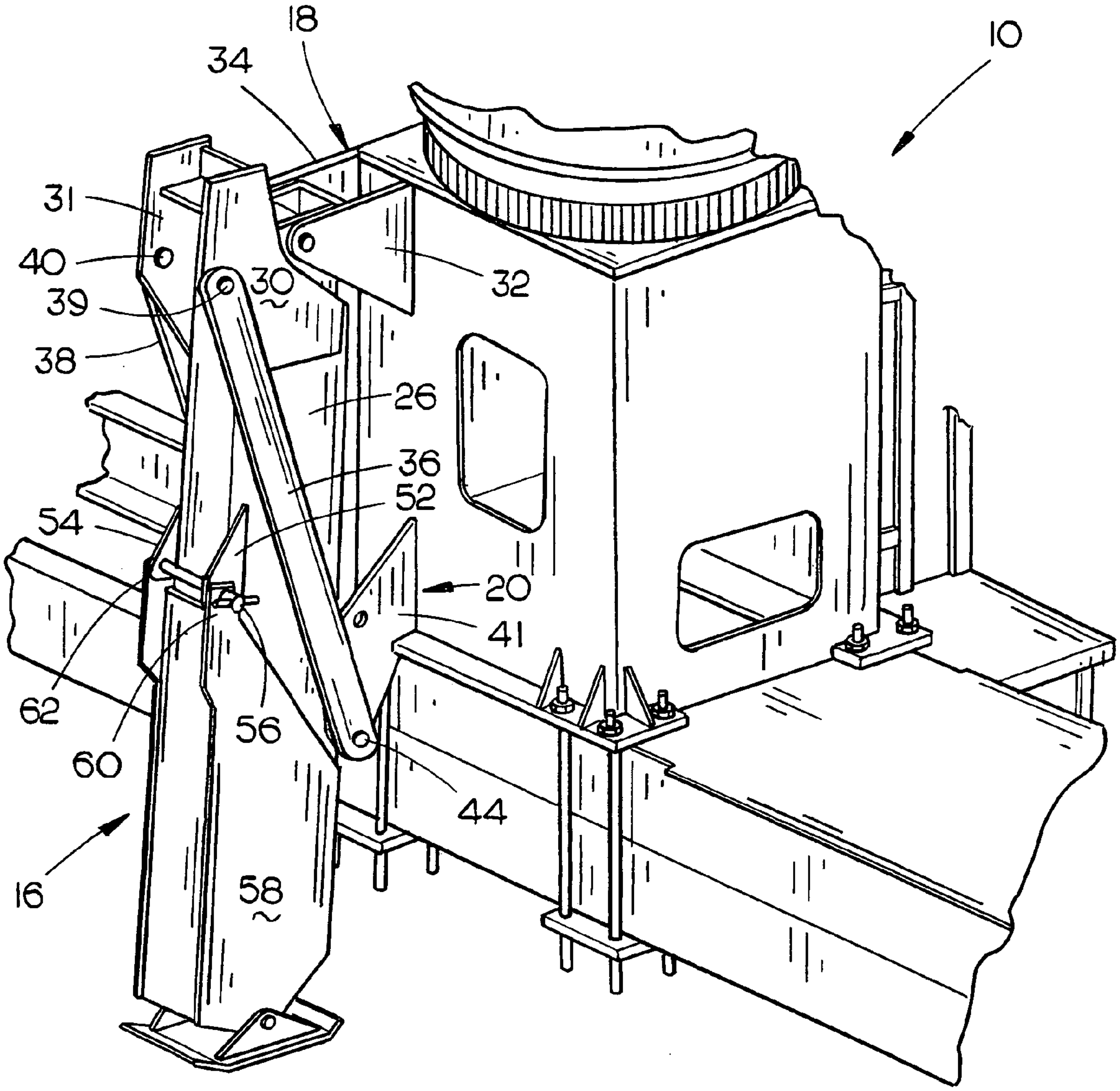
FIG. 3 is a perspective view of the dual mode outrigger of this invention in its inoperative or stowed position.
Figure 4:
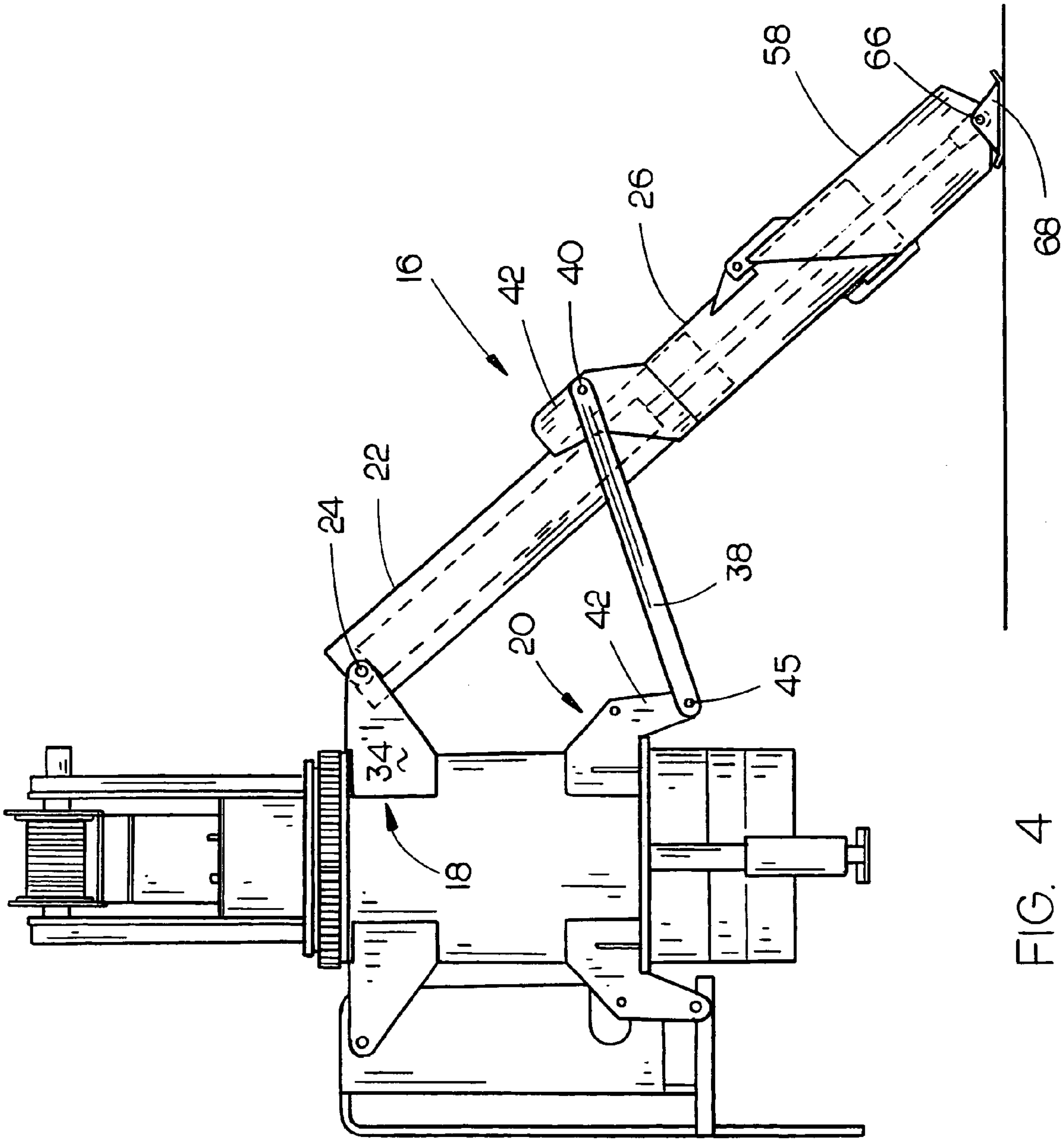
FIG. 4 is an end elevational view of the dual mode outrigger of this invention in its extended first mode position.
Figure 5:
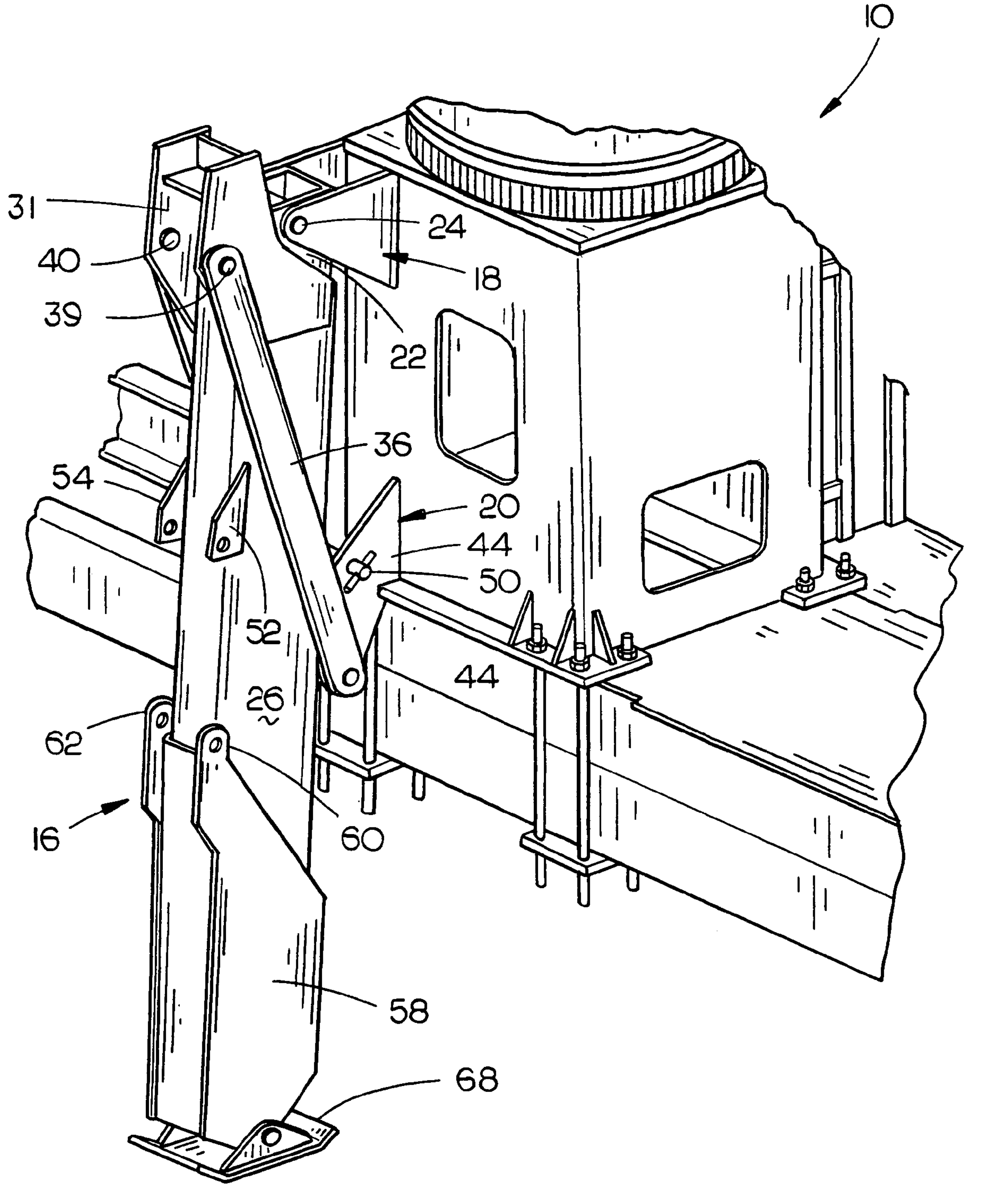
FIG. 5 is a perspective view of the dual mode outrigger of this invention in its extended second mode position.
Figure 6:
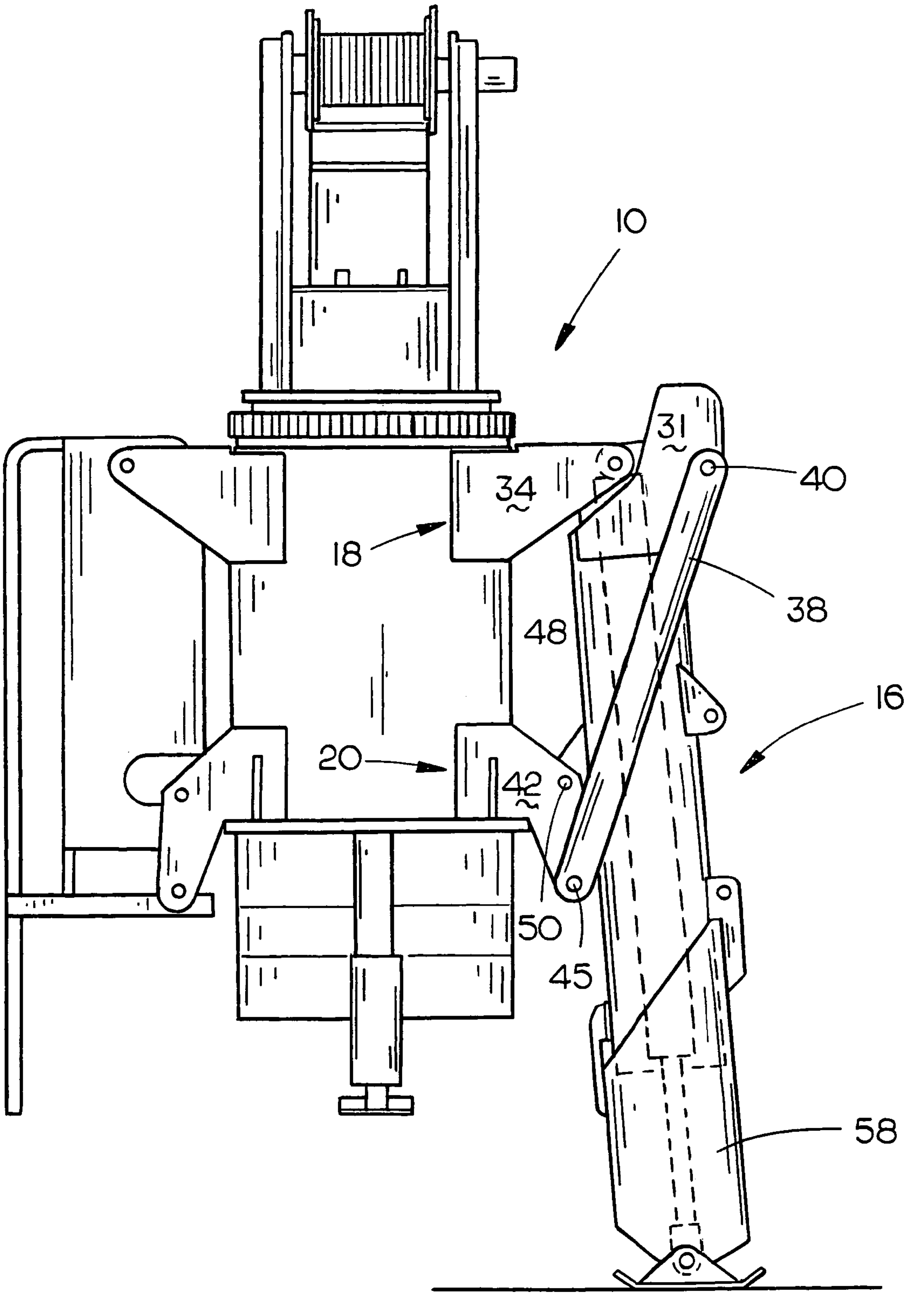
FIG. 6 is an end elevational view of the dual mode outrigger of this invention in its extended second mode position.
Figure 7:
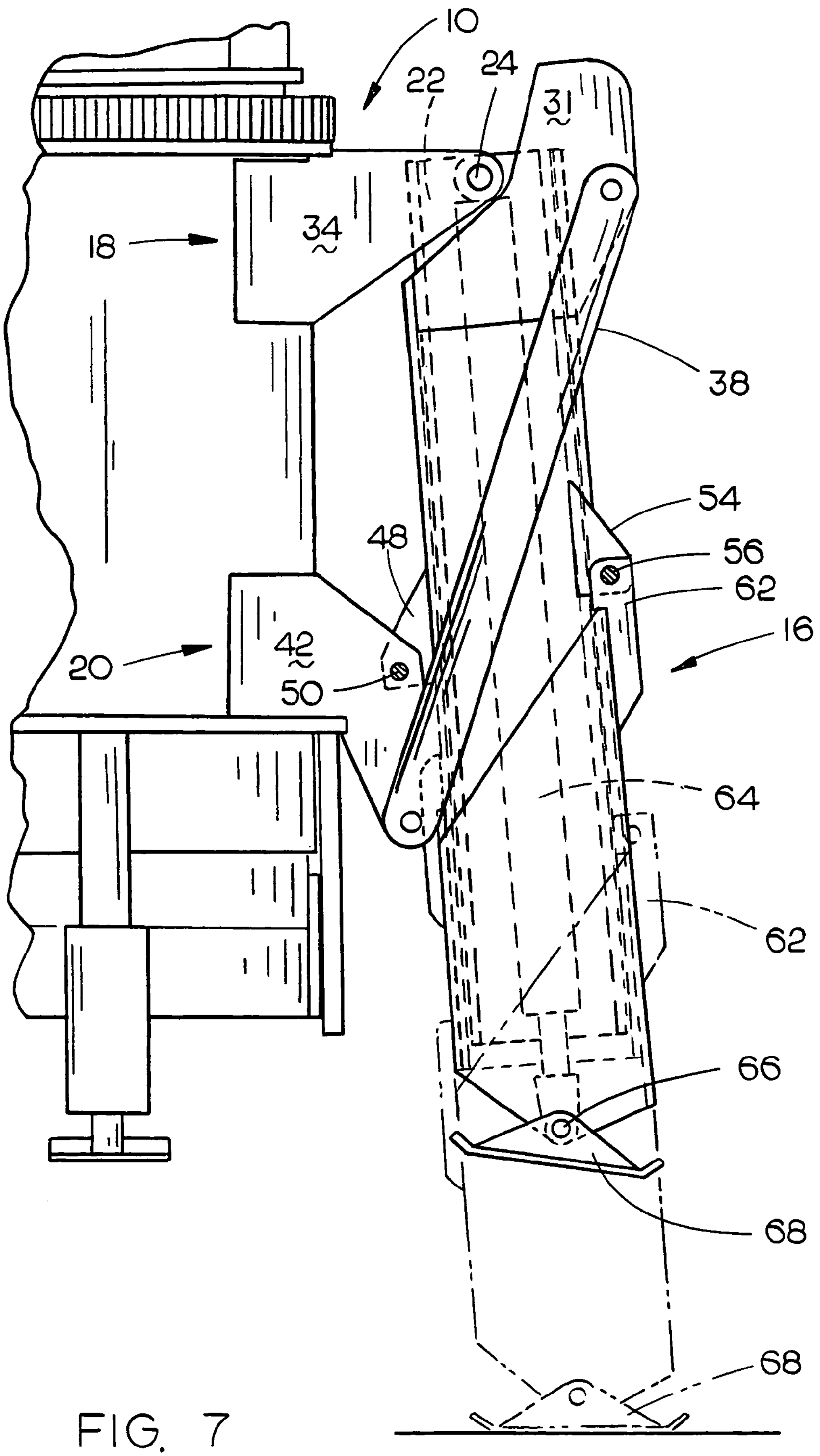
FIG. 7 is an end elevational view of the dual mode outrigger of this invention in its retracted or stowed position with the lower broken lines illustrating the outrigger in its extended second mode position.

In the normal operation of the outrigger assembly 16, pin 56 will connect third tubular member 58 to second tubular member 26 so that extension and retraction of hydraulic cylinder 64 will cause third tubular member 58 to move with second tubular member 26. In normal operation, extension of the hydraulic cylinder will cause the outrigger assembly 16 to pivot or swing outwardly from the stowed position of FIG. 3 to the position illustrated in FIG. 4. In the event that it is not possible to operate outrigger assembly 16 in conventional fashion due to traffic restrictions or the like, second tubular member 26 is pinned to the lower bracket assembly 20 by the pin 50 and the pin 56 connecting the third tubular member 58 to the second tubular member 26 is removed. Thus, in the second or dual mode of operation, extension of the hydraulic cylinder 64 only causes third tubular member 58 to be vertically moved downwardly with respect to second tubular member 26 without the normal outward swinging movement of the outrigger assembly 16 since second tubular member 26 is pinned, by pin 50, against swinging movement. Thus, the outrigger assembly, in the second mode of operation, can be lowered so stabilize or level the truck without being extended outwardly from the truck.

It can therefore be seen that a novel dual mode outrigger assembly has been provided which accomplishes at least all of its stated objectives.

I claim:

1. In combination:

a wheeled vehicle having first and second sides;

an upper bracket assembly secured to said vehicle at one side of said vehicle;

a lower bracket assembly secured to the one side of said vehicle below said upper bracket assembly;

an extensible downrigger mounted on at least the one side of said vehicle;

said downrigger including a first tubular member, having upper and lower ends, pivotally secured at its said upper end to said upper bracket assembly about a horizontal axis;

a second tubular member, having upper and lower ends;

said upper end of said second tubular member slidably embracing said lower end of said first tubular member;

a first mounting bracket at said upper end of said second tubular member;

a second mounting bracket secured to said second tubular member below said first mounting bracket;

a third mounting bracket secured to said second tubular member below said first mounting bracket;

a third tubular member having upper and lower ends;

a ground engaging shoe at the lower end of said third tubular member;

said upper end of said third tubular member slidably embracing said lower end of said second tubular member;

said upper end of said third tubular member having a mounting bracket secured thereto which is adapted to be selectively secured to said second mounting bracket on said second tubular member so that said third tubular member may be selectively moved with said second tubular member;

an elongated linkage having first and second ends;

said first end of said linkage being pivotally secured, about a horizontal axis, to said first mounting bracket on said upper end of said second tubular member;

said second end of said linkage being pivotally secured, about a horizontal axis, to said lower mounting bracket assembly at the one side of the vehicle;

said first mounting bracket at said upper end of said second tubular member being selectively secured to said lower bracket assembly on the one side of the vehicle;

an elongated hydraulic cylinder having upper and lower ends and being selectively movably between extended and retracted positions;

said hydraulic cylinder being positioned within said first, second and third tubular members;

said upper end of said cylinder being operatively connected to said upper bracket assembly on the one side of the vehicle;

said lower end of said cylinder being operatively connected to said third tubular member;

the extension of said cylinder, when said third mounting bracket on said second tubular member is secured to said lower bracket assembly at the one side of said vehicle and said mounting bracket on said upper end of said third tubular member is disconnected from said second mounting bracket on said second tubular member, causing said third tubular member to move downwardly relative to said second tubular member to cause said shoe to move into ground engagement;

the extension of said cylinder, when said third mounting bracket on said second tubular member is disconnected from said lower bracket assembly at the one side of said vehicle, causing said first, second and third tubular members to extend downwardly and outwardly from the one side of said vehicle.

* * * * *